United States Patent [19]

Laut et al.

[11] 4,403,059

[45] Sep. 6, 1983

[54] STORAGE-STABLE AQUEOUS ALKALI METAL SILICATE/FILLER ADHESIVE COMPOSITIONS AND THEIR USE

[75] Inventors: Bernhard Laut, Düren; Wolfgang Friedemann, Neuss; Gerd Krapp, Düsseldorf, all of Fed. Rep. of Germany

[73] Assignee: Henkel Kommanditgesellschaft auf Aktien, Dusseldorf-Holthausen, Fed. Rep. of Germany

[21] Appl. No.: 349,830

[22] Filed: Feb. 18, 1982

[30] Foreign Application Priority Data

Mar. 20, 1981 [DE] Fed. Rep. of Germany ....... 3110967

[51] Int. Cl.³ ............................. C09D 1/04; C09J 1/02
[52] U.S. Cl. .................................. 524/399; 156/325; 156/327; 156/334; 524/262; 524/425; 524/426; 524/556; 524/575
[58] Field of Search ...................... 156/325, 327, 334; 524/399, 425, 426, 262, 556, 575

[56] References Cited

U.S. PATENT DOCUMENTS

| | | | |
|---|---|---|---|
| 2,375,163 | 5/1945 | Zemaitas | 524/399 |
| 2,537,982 | 1/1951 | Finn | 524/399 |
| 2,965,589 | 12/1960 | Price | 524/399 |
| 2,984,634 | 5/1961 | Caldwell et al. | 524/399 |
| 3,492,265 | 1/1970 | Hefley et al. | 524/399 |
| 3,840,484 | 10/1974 | Lohr et al. | 524/399 |
| 4,207,218 | 6/1980 | Jorgensen et al. | 524/399 |
| 4,254,028 | 3/1981 | Ono et al. | 524/399 |
| 4,310,457 | 1/1982 | Agarwal et al. | 524/399 |

FOREIGN PATENT DOCUMENTS

| | | | |
|---|---|---|---|
| 2226762 | 12/1972 | Fed. Rep. of Germany | 156/325 |
| 2295103 | 7/1976 | France | 156/325 |
| 297336 | 9/1928 | United Kingdom | 156/325 |
| 1497188 | 1/1978 | United Kingdom | 156/325 |
| 2001333 | 1/1979 | United Kingdom | 156/325 |
| 2058818 | 4/1981 | United Kingdom | 156/325 |

*Primary Examiner*—Ronald W. Griffin
*Attorney, Agent, or Firm*—Hammond & Littell, Weissenberger and Muserlian

[57] ABSTRACT

An adhesive composition based upon an aqueous solution of alkali metal silicate with a content of powdered inorganic filler, having good storage stability, which comprises an aqueous alkali metal silicate solution containing:

(a) from 10% to 40% by weight of at least one powdered inorganic filler, (b) a suspension effective amount of at least one zinc soap of a fatty acid having from 12 to 22 carbon atoms and (c) from 0 to about 24% by weight of a 50% by weight stable, aqueous dispersion of an alkali-resistant organic polymer, based on the weight of the total composition.

Preferably zinc stearate in amounts of from 1% to 5% by weight are added to the adhesives containing powdered inorganic fillers and optionally organic additives on a base of aqueous water glass solutions, to prevent separation phenomena. Sodium and/or potassium silicate solutions can be used, the sodium silicate solution being preferably present in the ratio by weight of 3.3 to 3.9:1 for $SiO_2/Na_2O$, with a solids content of 38% to 28% by weight and the potassium silicate solution at a ratio by weight of 2 to 2.6:1 for $SiO_2/K_2O$, with a solids content of 40% to 29% by weight. The inorganic filler is preferably powdered crystalline calcium carbonate in the form of metamorphous calcite with particle sizes of up to 25 μm.

14 Claims, No Drawings

STORAGE-STABLE AQUEOUS ALKALI METAL SILICATE/FILLER ADHESIVE COMPOSITIONS AND THEIR USE

BACKGROUND OF THE INVENTION

This invention is directed to adhesives and coating materials based upon aqueous alkali metal silicate solutions, that is, waterglass solutions, with a content of powdered inorganic fillers, a zinc soap suspending agent and, optionally, organic additives. The subject of the invention is also the use of this type of adhesive or coating materials for the bonding and coating of mineral fiber boards or sheets.

Adhesives and/or coating materials, also referred to as adhesives in the following text, based on aqueous alkali metal silicate solutions, have been known for a long time and are used on a large scale in practice, for the most widely varying purposes. Such adhesives are used, for example, for the preparation of coating materials, paints and putties as well as for the gluing or bonding of wood, paper, ceramics and mineral insulation materials. Such adhesives are used also especially for the preparation of mineral fiber sheets and boards that are laminated with metal foil, which find application in the construction industry as insulation or barrier materials.

Problems due to a settling of the fillers contained in the adhesive frequently appear during the application and processing of such adhesives. Such effects shorten the storage stability of the adhesives to a considerable degree.

OBJECTS OF THE INVENTION

An object of the present invention is the development of such adhesives and/or coating materials based on water glass with a filler content, which do not have the disadvantage mentioned above and are particularly suitable for the bonding and/or coating of mineral fiber boards or sheets.

Another object of the present invention is the development of an adhesive composition based upon an aqueous solution of alkali metal silicate with a content of powdered inorganic filler, having good storage stability, which comprises an aqueous alkali metal silicate solution containing:

(a) from 10% to 40% by weight of at least one powdered inorganic filler, (b) a suspension effective amount of at least one zinc soap of a fatty acid having from 12 to 22 carbon atoms and (c) from 0 to about 24% by weight of a 50% by weight stable, aqueous dispersion of an alkali-resistant organic polymer, based on the weight of the total composition.

These and other objects of the invention will become more apparent as the description thereof proceeds.

DESCRIPTION OF THE INVENTION

The addition of zinc soaps to water glass adhesives or coating materials with a filler content was found to lead to the solution of the problem according to the invention.

The invention more particularly relates to an adhesive composition based upon an aqueous solution of alkali metal silicate with a content of powdered inorganic filler, having good storage stability, which comprises an aqueous alkali metal silicate solution containing:

(a) from 10% to 40% by weight of at least one powdered inorganic filler, (b) a suspension effective amount of at least one zinc soap of a fatty acid having from 12 to 22 carbon atoms and (c) from 0 to about 24% by weight of a 50% by weight stable, aqueous dispersion of an alkali-resistant organic polymer, based on the weight of the total composition.

Accordingly, the adhesives and/or coating materials according to the invention contain preferably from 1% to 5% by weight of zinc soaps, calculated for the total composition. Here, the general rule applies that the amount of added zinc soaps can be kept low with a high filler content, but that a larger amount of added zinc soaps is advantageous with a low filler content. Particularly preferred according to the invention are additions of from 1.5% to 2% by weight of the zinc soaps.

Of the zinc soaps which are suitable, especially zinc stearate is used according to the invention.

The adhesives and/or coating materials according to the invention are based on aqueous alkali metal silicate solutions, as previously mentioned. This means that sodium water glass as well as potassium water glass, or the corresponding mixtures of water glasses can be used for the materials according to the invention. When mixed water glass products are used, the mixing ratio can be generally varied within wide limits. However, a composition containing 30% by weight of sodium silicate solution and 70% by weight of potassium silicate solution is generally preferred for this purpose.

With respect to the purpose of the invention, the adhesives according to the invention contain preferably 30% to 80% by weight, based on the weight of the total composition, of an aqueous alkali metal silicate solution having a solids content of from about 28% to 40% by weight, such as an aqueous sodium and/or potassium silicate solution, calculated for the total composition. The sodium silicate solution has a ratio by weight of 3.3 to 3.9:1 for $SiO_2/Na_2O$ as well as a solids content of 28% to 38% by weight, and the potassium silicate solution has a ratio by weight of 2 to 2.6:1 for $SiO_2/K_2O$ as well as a solids content of 29% to 40% by weight.

The adhesives according to the invention and/or coating materials contain preferably from 10% to 40% by weight of powdered inorganic fillers with a particle size up to 25 $\mu$m, based on the total composition. Suitable for this are generally all known inorganic fillers that are compatible with water glass, for example, quartz powder, kaolins, calcium carbonate, micro-mica or magnesium aluminum silicates. Preferred as filler is powdered, crystalline calcium carbonate with a particle size of up to 25 $\mu$m, preferably from 0.1 to 25 $\mu$m. The particles size can be determined, for example, with the aid of a Coulter Counter ®. The use especially of metamorphous calcite as crystalline calcium carbonate has proved to be advantageous for the prevention of a premature curing or hardening of the adhesive.

The adhesives and/or coating materials according to the invention may optionally contain a stable aqueous dispersion of an alkali-resistant organic polymer based on acrylate, styrene/acrylate and/or styrene/butadiene polymers.

The materials according to the invention contain preferably from 0 to 24% by weight of a 50% by weight aqueous dispersion of the organic polymers, based on the total composition.

Suitable as organic polymers for this purpose are water-insoluble commercial homopolymers and/or copolymers of acrylic acid esters (acrylates), styrene/acrylate copolymers or styrene/butadiene copolymers such as are offered, for example, under the names Acronal ® (available from BASF) or Mowilith ® (available from Hoechst). The water-resistance of bonds or of the dried coating materials obtained with the adhesives according to the invention is considerably improved by such an addition. However, an addition of organic polymers can be generally avoided in the interest of an increased flame-resistance of the bonded of coated final products.

For the stabilization of the aqueous alkali metal silicate solution, that is, the prevention of a precipitation of $SiO_2$, the solution can optionally contain, if desired, an addition of a water-soluble quaternary and/or polyquaternary nitrogen compound containing at least one hydroxyl-free alkyl group attached to the quaternary nitrogen atom. Such stabilizers are described, for example, in German published application DE-OS 16 67 538.

With respect to the water-resistance of the bond to be produced, the optional addition of up to about 2% by weight of lithium hydroxide, based on the weight of the total composition, to the adhesives and/or coating materials according to the invention can be an advantage. The adhesives also can contain powdered alkali-resistant dye pigments compatible with water glass, as they are normally used for such purposes, in an amount of from 0 up to about 1% by weight. Suitable as pigments are, for example, titanium dioxide, iron oxide, chromium oxide, barium chromate, cobalt green or cobalt blue as well as cadmium selenide or cadmium sulfide.

The adhesives according to the invention can be prepared without problems by mixing the individual components. As a rule, the alkali metal silicate solution, or the mixture of sodium and potassium silicate solutions, is transferred into the mixing vessel and the fillers and zinc soap are added with agitation. The aqueous dispersion of the organic polymer is stirred into this mixture, if desired. The adhesive obtained by this process has excellent storage stability, in view of the settling behavior, when air is excluded.

The adhesives and/or coating materials according to the invention are used preferably for the bonding and/or coating of mineral fiber boards or sheets. This means especially the laminating of mineral fiber boards or sheets with metal foils. Besides this, however, the adhesives according to the invention can also be used for all those purposes for which the adhesives based on aqueous alkali metal silicate solutions are normally used.

The adhesives and/or coating materials in the sense of the invention are explained in more detail in the following examples. These, however, are not to be construed as limitative of the invention.

EXAMPLE 1

An adhesive according to the invention had the following composition:
(a) 78.5% by weight of an aqueous sodium silicate solution with a ratio by weight of 3.35 for $SiO_2/Na_2O$ and a solids content of 35% by weight,
(b) 10% by weight of crystalline calcium carbonate with particle sizes ranging from 0.1 to 25 μm,
(c) 1.5% by weight of zinc stearate,
(d) 5% by weight of a 50% by weight aqueous polyacrylate dispersion,
(e) 5% by weight of deionized water.

The adhesive was obtained, as described above, by stirring the inorganic filler, the zinc soap as well as the dispersion of the organic polymer into the water glass solution. The complete mixture was agitated until it was completely homogenized.

The adhesive was tested for its settling behavior by the following method. 250 ml of the well homogenized adhesive were transferred to a graduated cylinder, and the solids sedimentation in the closed cylinder was observed over a period of up to 4 weeks. The onset of a sedimentation of the solids is indicated by a clearly visible phase separation into supernatant clear solution on the one hand, and the settling filler component on the other hand. The use of the graduated cylinder allowed the reading of the respective amounts in ml. This test method may necessitate the reading of the proportions of the respective phases at shorter intervals, for example, in the case of strongly settling fillers. A daily control is otherwise sufficient.

No phase separation was observed in the case of the adhesive according to the invention in question, even after an extended testing period of over 5 weeks.

The adhesive formulations according to the invention described in the following examples were prepared and tested analogous to Example 1. Unless otherwise stated, these adhesive formulations have good properties comparable to Example 1 with respect to the settling behavior.

EXAMPLE 2

(a) 78.5% by weight of an aqueous sodium silicate solution analogous to that of Example 1,
(b) 10% by weight of crystalline calcium carbonate with particle sizes of from 0.1 to 25 μm,
(c) 1.5% by weight of zinc behenate,
(d) 5% by weight of a 50% by weight polymer dispersion analogous to that of Example 1,
(e) 5% by weight of deionized water.

EXAMPLE 3

(a) 78.5% by weight of an aqueous sodium silicate solution analogous to that of Example 1,
(b) 10% weight of crystalline calcium carbonate with particle sizes of from 0.1 to 25 μm,
(c) 1.5% by weight of zinc laurate,
(d) 5% by weight of a 50% by weight polymer dispersion analogous to that of Example 1,
(e) 5% by weight of deionized water.

A phase separation into 10 ml clear supernatant and 240 ml residual adhesive containing filler became apparent in this case after 24 hours. A significant further change was not observed even after an extended testing period of over 5 weeks.

EXAMPLE 4

(a) 78.5% by weight of an aqueous alkali metal silicate solution containing:
70% by weight of potassium waterglass with a weight ratio of 2.6 for $SiO_2/K_2O$ and a solids content of 28.5% by weight, as well as 30% by weight of sodium waterglass with a weight ratio of 3.3 for $SiO_2/Na_2O$ and a solids content of 36% by weight.
(b) 10% by weight of crystalline calcium carbonate with particle sizes of from 0.1 to 25 μm,
(c) 1.5% by weight of zinc stearate, (d) 5% by weight of a 50% by weight aqueous polyacrylate dispersion,
(e) 5% by weight of deionized water.

EXAMPLE 5

(a) 60% by weight of an aqueous alkali metal silicate solution analogous to that of Example 4,
(b) 30% by weight of crystalline calcium carbonate with particle sizes of from 0.1 to 25 μm,
(c) 1% by weight of zinc stearate,
(d) 5% by weight of a 50% by weight polymer dispersion analogous to that of Example 4,
(e) 4% by weight of deionized water.

EXAMPLE 6

(a) 59.5% by weight of an aqueous alkali metal silicate solution analogous to that of Example 4,
(b) 10% by weight of crystalline calcium carbonate with particle sizes of from 0.1 to 25 μm,
(c) 1.5% by weight of zinc stearate,
(d) 24% by weight of a 50% by weight polymer dispersion analogous to that of Example 4,
(e) 5% by weight of deionized water.

EXAMPLE 7

(a) 40% by weight of an aqueous alkali metal silicate solution analogous to that of Example 4,
(b) 30% by weight of crystalline calcium carbonate with particle sizes of from 0.1 to 25 μm,
(c) 1% by weight of zinc stearate,
(d) 24% by weight of a 50% by weight polymer dispersion analogous to that of Example 4,
(e) 5% by weight of deionized water.

EXAMPLE 8

(a) 78% by weight of an aqueous alkali metal silicate solution analogous to that of Example 4,
(b) 10% by weight of crystalline calcium carbonate with particle sizes of from 0.1 to 25 μm,
(c) 2% by weight of zinc stearate,
(d) 5% by weight of a 50% by weight polymer dispersion analogous to that of Example 4,
(e) 5% by weight of deionized water.

Corresponding adhesive formulations without an addition of the zinc soaps according to the invention exhibited a more or less strongly pronounced phase separation during the testing for the settling behavior, usually after only 24 hours.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An adhesive composition based upon an aqueous solution of alkali metal silicate with a content of powdered inorganic filler, having good storage stability, which comprises an aqueous alkali metal silicate solution containing:
   (a) from 10% to 40% by weight of at least one powdered inorganic filler,
   (b) a suspension effective amount of at least one zinc soap of a fatty acid having from 12 to 22 carbon atoms and
   (c) from 0 to about 24% by weight of a 50% by weight stable, aqueous dispersion of an alkali-resistant organic polymer, based on the weight of the total composition.

2. The adhesive composition of claim 1 wherein said aqueous alkali metal silicate solution has a solids content of from about 28% to 40% by weight.

3. The adhesive composition of claim 1 or 2 wherein said zinc soap is present in an amount of from about 1% to 5% by weight, based on the total composition.

4. The adhesive composition of claim 1 or 2 wherein said zinc soap is present in an amount of from about 1.5% to 2% by weight, based on the total composition.

5. The adhesive composition of claim 1 or 2 wherein said zinc soap is zinc stearate.

6. The adhesive composition of claim 3 wherein said zinc soap is zinc stearate.

7. The adhesive composition of claim 4 wherein said zinc soap is zinc stearate.

8. The adhesive composition of claim 1 or 2 wherein said aqueous alkali metal silicate solution is present in an amount of from 30% to 80% by weight, based on the total composition, and has a solids content of from about 28% to 40% by weight.

9. The adhesive composition of claim 8 wherein said alkali metal silicate solution is selected from the group consisting of (a) sodium silicate solution having a weight ratio of 3.3 to 3.9:1 for $SiO_2/Na_2O$ and a solids content of from 28% to 38% by weight, (b) potassium silicate solution having a weight ratio of 2 to 2.6:1 for $SiO_2/K_2O$ and a solids content of from 29% to 40% by weight, and (c) mixtures thereof.

10. The adhesive composition of claim 1 or 2 wherein said at least one powdered inorganic filler is powdered crystalline calcium carbonate having particle sizes of from 0.1 to 25 μm.

11. The adhesive composition of claim 10 wherein said crystalline calcium carbonate is metamorphous calcite.

12. The adhesive composition of claim 1 wherein said aqueous dispersion of an alkali-resistant organic polymer is present in an amount of from 5% to 24% by weight and is based on acrylate polymers, styrene/acrylate polymers or styrene/butadiene polymers.

13. An adhesive composition based upon an aqueous solution of alkali metal silicate with a content of powdered inorganic filler, having good storage stability, consisting essentially of
   (a) from 30% to 80% by weight of an aqueous alkali metal silicate solution having a solids content of from 28% to 40% by weight,
   (b) from 10% to 40% by weight of at least one powdered inorganic filler having particle sizes of from 0.1 to about 25 μm,
   (c) from 1% to 5% by weight of at least one zinc soap of a fatty acid having from 12 to 22 carbon atoms,
   (d) from 0 to about 24% by weight of a 50% by weight stable, aqueous dispersion of an alkali-resistant organic polymer compatible with said alkali metal silicate solution, and
   (e) from 0 to about 5% by weight of additives for adhesive composition selected from the group consisting of quaternary nitrogen compounds, lithium hydroxide, and alkali-resistant dye pigments compatible with said alkali metal silicate solution.

14. In the process of bonding mineral fiber boards or sheets or coating mineral fiber boards or sheets employing an effective amount of an adhesive composition based on aqueous alkali metal silicate solutions, the improvement consisting of employing the adhesive composition of claim 1.

* * * * *